United States Patent [19]

Lam

[11] Patent Number: 4,976,007

[45] Date of Patent: Dec. 11, 1990

[54] CONNECTING DEVICE FOR PORTABLE COMPUTERS

[75] Inventor: Pak-Lee Lam, Taipei, Taiwan

[73] Assignee: Quanta Computer Inc., Taipei, Taiwan

[21] Appl. No.: 369,961

[22] Filed: Jun. 22, 1989

[51] Int. Cl.$^5$ .................. E05F 1/08; E05C 17/64
[52] U.S. Cl. ........................................ 16/302; 16/342
[58] Field of Search ............... 16/282, 283, 302, 308, 16/337, 342

[56] References Cited

U.S. PATENT DOCUMENTS

| | | | |
|---|---|---|---|
| 1,821,136 | 9/1931 | Bolakowski | 16/302 |
| 2,883,699 | 4/1959 | Gross | 16/302 |
| 2,935,761 | 5/1960 | Frohlich | 16/283 |

FOREIGN PATENT DOCUMENTS 2057000 7/1971 Fed. Rep. of Germany ........ 16/342

*Primary Examiner*—Richard K. Seidel
*Assistant Examiner*—Carmine Cuda
*Attorney, Agent, or Firm*—Lowe, Price, LeBlanc, Becker & Shur

[57] ABSTRACT

A connecting device for portable computers includes: a housing unit with an open section formed at one side, a pivot opening, a bolt stud with a bolt hole formed therethrough and a blind screw hole respectively provided at another side of the housing unit; a first pivot bolt movably disposed in the pivot opening through the open section of the housing unit; a second pivot bolt movably disposed in the bolt hole; a first torsional element disposed around a middle portion of the first pivot bolt; a second torsional element installed around the bolt stud in connection with the second pivot bolt; and a linking member formed in conjunction with the open section of the housing unit and provided with a plurality of through openings, a stud hole thereof being connected to the housing unit in conjunction with the first and second pivot bolts; whereby, different positioning effects of the connecting device can be achieved through the turning movements of the first and second pivot bolts.

4 Claims, 5 Drawing Sheets

CONNECTING DEVICE FOR PORTABLE COMPUTERS

FIELD OF THE INVENTION

This invention relates to a connecting device, and particularly to a kind of connecting device designed to be incorporated with a portable computer for providing different angles of elevation therewith.

BACKGROUND OF THE PRIOR ART

At present, portable computers, such as the type shown in FIG. 1, are widely used the world over. In the structure of this portable computer, the cathode-ray-tube (CRT) display A1 is pivotally connected to the host computer unit B1 by means of a pivot joint which is formed with a pair of lobes C1, C2 integrally provided at a back side of the CRT display A1 and a pair of pivot slots D1, D2 located in the host computer unit B1 for receiving a pair of pivot pins (not shown) separately connected to the lobes C1, C2 of the CRT display A1. With this manner of connection, the CRT display A1 is placed on the host computer unit B1 as a covering member and can be operated to open and close along the pivot joint thereof when the associated portable computer is placed on a flat surface.

Although the conventional pivot joint as described above can function properly to perform the required opening and closing operations, an inconvenience may be encountered during the practical usage thereof. As shown in FIG. 2, the conventional pivot joint arranged in the portable computer can only enable the CRT display A1 to be lifted up at a fixed angle no matter where the host computer unit B1 is positioned. Since portable computers are designed not only to be placed on a desk but also to be placed wherever the user wishes according to his/her needs at the time, such as on his/her lap while sitting on an airplane, etc. Therefore, the fixed angle of elevation of the CRT display A1 cannot meet the requirements of the ordinary users who must carry their portable computers along with them when they need to work at a computer while away from the office.

SUMMARY OF THE INVENTION

It is accordingly a primary object of the present invention to provide a connecting device for portable computers with a structural arrangement by which different angles of elevation can be provided for satisfying various working requirements.

It is a further object of the present invention to provide a connecting device for portable computers with a structural arrangement by which a certain angle of elevation can be automatically effected through an elastic force thereof to ensure convenient operations.

These and other objects of the present invention are achieved by the provision of a connecting device for portable computers, which connecting device comprises: a housing unit having an open section formed at one side, a pivot opening and a bolt stud with a bolt hole respectively provided at another side thereof; a first pivot means with a front neck portion rotatably disposed in the pivot opening of said housing unit through the open section thereof; a second pivot means with a front neck portion rotatably installed in the bolt hole of said bolt stud through the open section of said housing unit; a first torsional element disposed around a middle portion of said first pivot means for providing a twisting force in combination with said first pivot means; a second torsional element closely installed around the bolt stud of said housing unit in connection with said second pivot means for providing a twisting force in combination with said second pivot means; and a linking member with a plurality of pivot holes and a screw opening formed therein, which is fixed in the open section of said housing unit with each rear neck portion of said first and second pivot means being movably disposed in the pivot holes of said linking member. The assembled connecting device according to the present invention is installed in a pivot slot provided in a portable computer with the front end and rear end of said first and second pivot means respectively fixed to the back side of a CRT display and the associated host computer. In this way, when the CRT display is closed against the related host computer, said first torsional element will be twisted under tension against said first pivot means while, when said CRT display is opened, an elastic force which is released from said first torsional element will automatically push said CRT display open at a certain angle thereat. Consequently, said CRT display can be further opened therefrom to an angle of about 90 degrees relative to said host computer and kept in a desired position by said first pivot means and said first torsional element. Moreover, said CRT display, which is already opened at about 90 degrees, can still be turned over and supported by said second pivot means and said second torsional element, resulting in different angles of elevation as the situation of the related portable computer requires.

Other advantages and characteristics of the present invention will become apparent from the following detailed description of a preferred embodiment when read in conjunction with the accompanying drawings.

DETAILED DESCRIPTION OF THE PREFERRED EMBODIMENT

Figure 1:
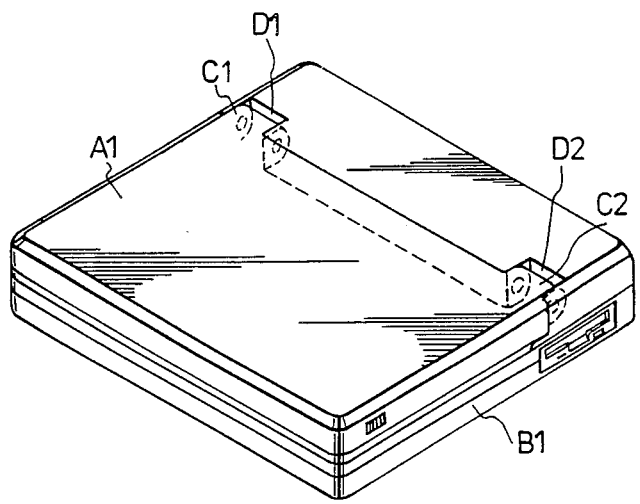
FIG. 1 is a perspective view of a portable computer provided with a conventional pivot joint.
Figure 2:
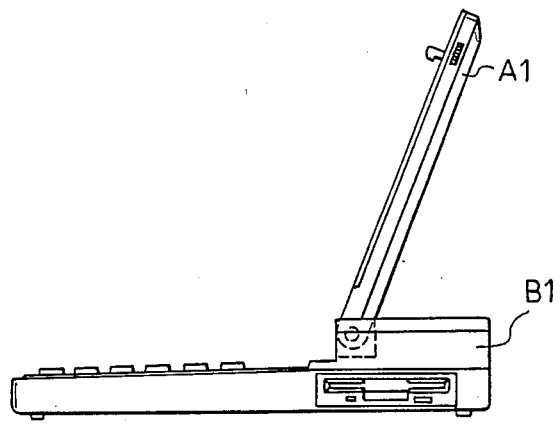
FIG. 2 is an illustrative view of the portable computer of FIG. 1 with the CRT display thereof being opened at a fixed angle of elevation via the conventional pivot joint.
Figure 3:
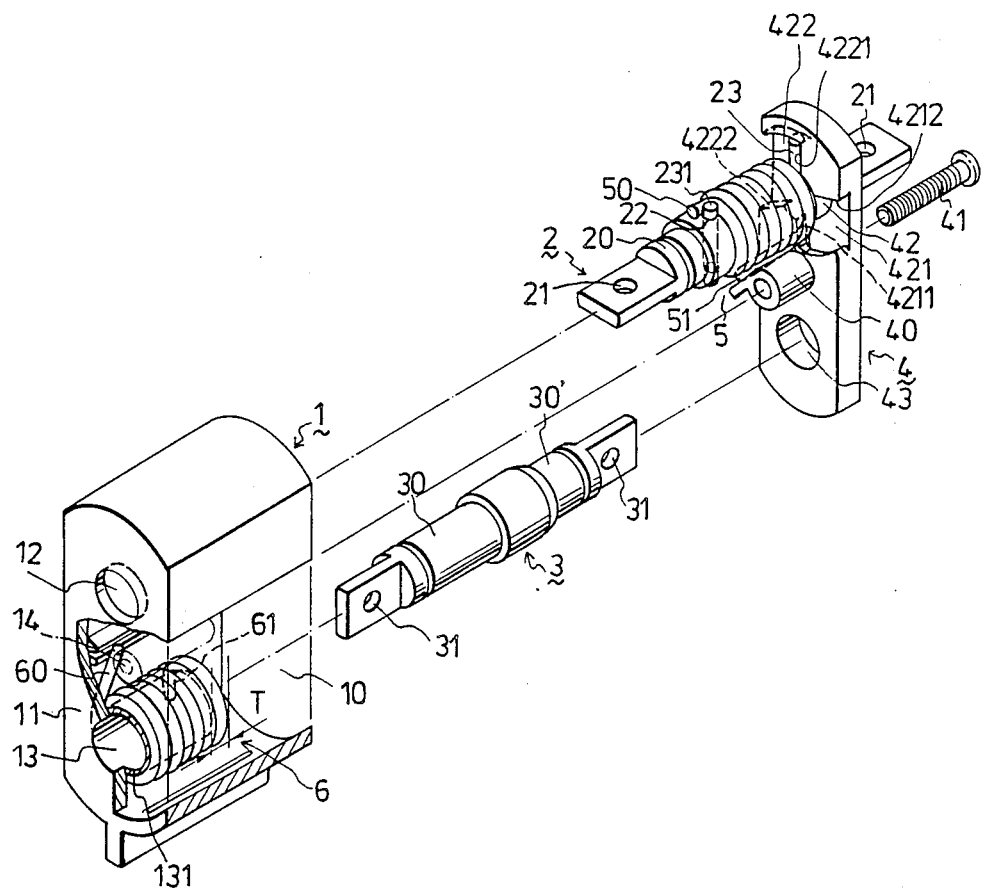
FIG. 3 is an exploded and perspective of a preferred embodiment of a connecting device for portable computers according to the present invention.
Figure 4:
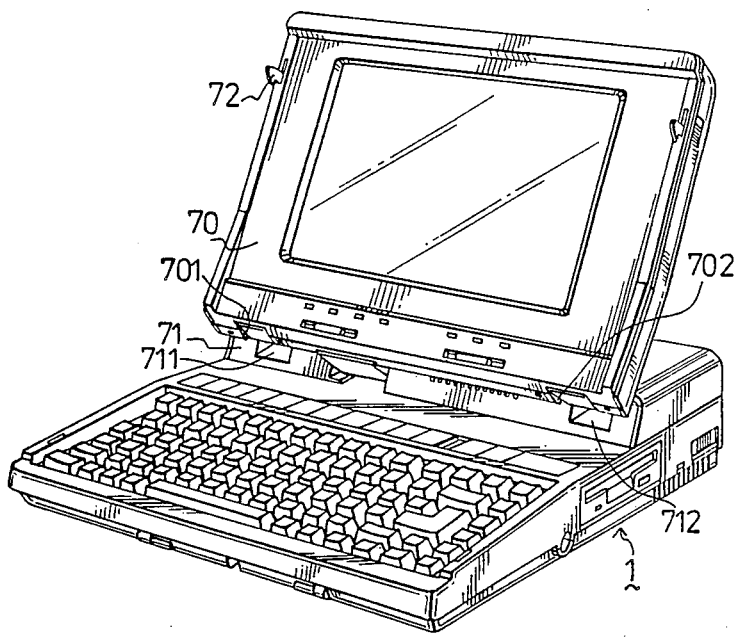
FIG. 4 is a perspective view of a portable computer which incorporates the preferred embodiment of FIG. 3.

Referring to FIGS. 3 and 4, the preferred embodiment of a connecting device for portable computers according to the present invention comprises a combination of a housing unit 1, a first pivot bolt 2, a second pivot bolt 3, a linking member 4, a first torsional element 5 and a second torsional element 6. The housing unit 1 is rectangularly shaped, having an open section 10 formed in one side thereof, a pivot opening 12 and a bolt hole 13, which is formed in a bolt stud 131, separately located in another side 11 thereof opposite said open section 10, and a blind screw hole 14 provided in the inner wall of said side 11 wherein the internal diameters of said pivot opening 12 and said bolt hole 13 are identical to each other.

As shown in FIG. 3, the first pivot bolt 2 includes: a front neck portion 20 for being movably engaged in said pivot opening 12 of said housing unit 1; a rear neck portion 20', (which is hidden in the drawing); and a screw hole 21 provided at each end thereof for being connected to the CRT display of a portable computer, (not shown in FIG. 3), wherein the outer diameter of said front neck portion 20 is identical to the internal diameter of said pivot opening 12 of the housing unit 1. In addition, said first pivot bolt 2 is provided with a pin hole 22 at a front portion thereof with a stop pin 231 disposed therein and a check pin 23 fixed at the rear portion thereof.

The structure of said second pivot bolt 3 is similar to that of said first pivot bolt 2 except that the front neck portion 30 is longer than the rear neck portion 30' and the outer diameter of said front neck portion 30 is identical to the internal diameter of the bolt hole 13 of said bolt stud 131. The front neck portion 30 of said second pivot bolt 3 is rotatably installed in the bolt stud 131 through the bolt hole 13 thereof with the front end of said pivot bolt 3 extending out of said bolt hole 13 so as to be connected to a host computer through the screw hole 31 of said pivot bolt 3.

The linking member 4 which is formed in conjunction 10 with the open section 10 of said housing unit 1 so as to be fixedly disposed therein includes: an upper through hole 42 being movably engaged with the rear neck portion 20' of said first pivot bolt 2; a lower through hole 43 being movably engaged with the rear neck portion 30' of said second pivot bolt 3; and a stud hole 40 in the middle portion thereof which is screw-connected to the blind screw hole 14 of said housing unit 1 by means of a screw bolt 41. Moreover, said linking member 4 is provided with a vertical recess 422 and a horizontal recess 421 at the upper portion thereof and is located relatively close to said upper through hole 42 for being movably abutted by the check pin 23 of said first pivot bolt 2 at the upper edges 4221, 4212 and the lower edges 4222. 4211 of said vertical and horizontal recesses 422, 421 when said first pivot bolt 2 is rotated in both directions during the opening and closing of the CRT display.

The first and second torsional elements 5, 6 are respectively disposed on said first pivot bolt 2 and said bolt stud 131 of the housing unit 1 wherein one end 50 of said first torsional element 5 is forwardly fixed at the middle portion of said first pivot bolt 2 in connection with said stop pin 231 and the other end 51 thereof is kept in position by the stud hole 40 of said linking member 40. Said second torsional element 6 is inversely installed around said bolt stud 131 in a directional relationship with first torsional element 5, having both ends 60, 61 separately positioned on the inner wall of said housing unit 1 and a portion of said torsional element 6 extending out of said bolt stud 131, as shown by the line T.

Referring to FIGS. 4 and 5 (A, B, C, D) in connection with FIG. 3, a portable computer 7 includes, as usual, a CRT display 70 and a host computer 71 wherein said CRT display 70 and said host computer 71 are each provided with a pair of pivot locating slots 701, 702 and 711, 712 in conjunction with the housing unit 1 and the first and second pivot bolts 2, 3. To install the assembled housing unit 1 in the CRT display 70 and the host computer 71, the two extending ends of said first pivot bolt 2, together with the upper portion of said housing unit 1, are fixedly connected to the CRT display 70 by means of screws (not shown) through the screw holes 21 of said first pivot bolt 2 in the pivot locating slots 701, 702 of the CRT display 70 while the two extending ends of said second pivot bolt 3, together with the lower portion of said housing unit 1, are separately fastened in the host computer 71 by means of screws (not shown) through the screw holes 31 of said second pivot bolt 3 in said pivot-locating slots 711, 712, as shown in FIG. 5A.

Figure 5A:
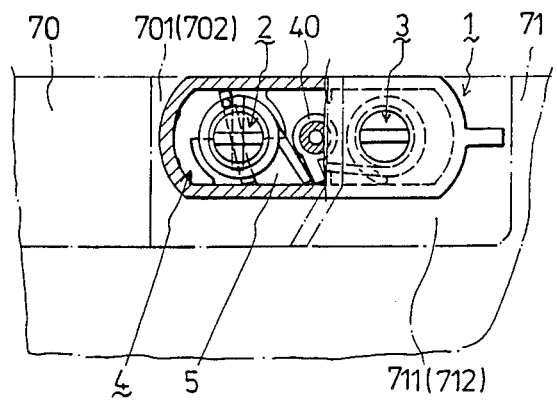
FIGS. 5A, 5B, 5C and 5D are schematic illustrations respectively indicating the installation and applications of the preferred embodiment in a portable computer.

After the assembly is completed, when the CRT display 70 is closed against the host computer 71, as shown in FIG. 5A, the first torsional element 5 will be forwardly twisted under tension around said first pivot bolt 2 and a retaining tab 72, (as shown in FIG. 4), will be engaged with said host computer 71 so as to keep said CRT display 70 in position thereat.

Figure 5B:
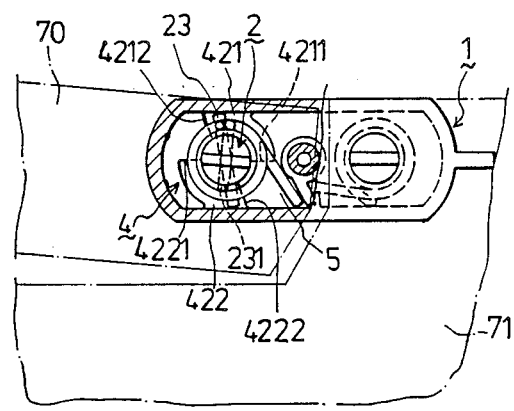
Figure 5C:
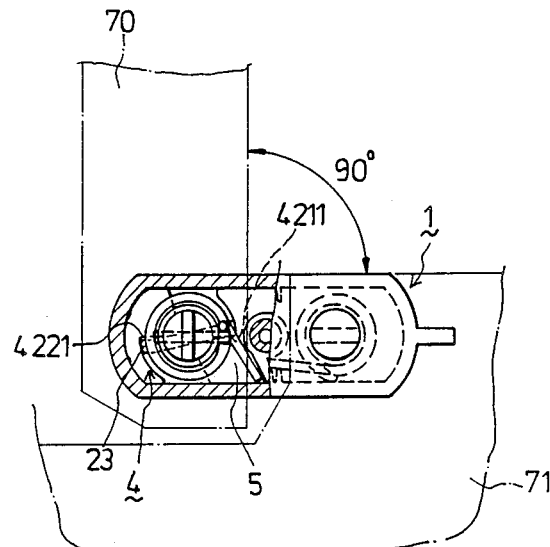
Figure 5D:
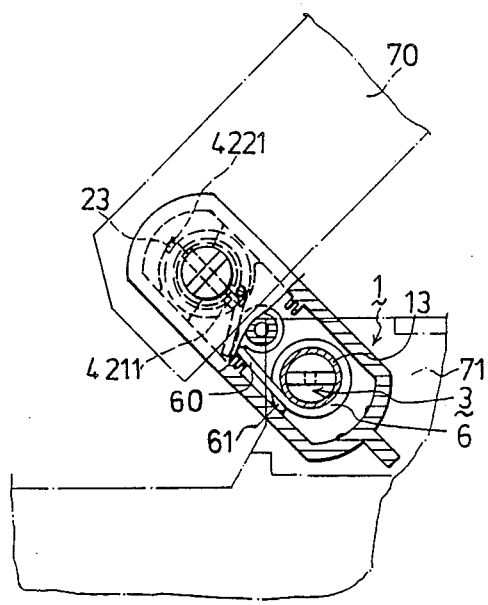

When the retaining tab 72 of said CRT display 70 is disengaged with said host computer 71, owing to the elastic force which is released from the twisted tension of said first torsional element 5, said CRT display 70 will be pushed open a certain distance away from said host computer 71, as shown in FIG. 5B. In this situation, said first pivot bolt 2 can be turned a certain distance which is defined by the movement of said check pin 23 between the lower edges 4211, 4221 of said horizontal recess 422 and said vertical recess 421 of said linking member 4. Therefore, said CRT display 70 can be easily turned upward to a full 90 degrees, as shown in FIG. 5C, at which point both ends of said check pin 23 of said first pivot bolt 2 are separately positioned at the lower edges 4211, 4221 of the horizontal and vertical recesses 421, 422 of said linking member 4. At this position, said first pivot bolt 2 can no longer be turned forward.

If said CRT display 70 is lifted upward further, said linking member 4, together with said housing unit 1, will be moved upward, both causing said second pivot bolt 3 to make a forward turn and said second torsional element 6 to twist under tension thereat. Since said second torsional element 6 is closely engaged with said bolt stud 131 of said housing unit 1, a considerable amount of friction exists between said second torsional element 6 and said bolt stud 131. This friction comprises a force which is greater than the closing or lowering force of said CRT display 70 and therefore can keep said CRT display 70 at different angles of elevation. If no external force is applied to close or lower said CRT display 70, said CRT display 70 will not lower by itself simply via second torsional element 6.

Having thus described the invention, it is to be understood that many embodiments thereof will suggest themselves to persons skilled in the art without departing from the spirit and scope of the invention. Therefore, it is intended that the specification and drawings be interpreted as illustrative rather than in a limiting sense, except as defined in the appending claims.

What is claimed is:

1. A connecting device for portable computers, comprising:
    a housing unit having an open section formed at one side thereof, a pivot opening, a bolt hole which passes through a bolt stud, and a blind screw hole respectively provided at another side thereof for making connections therewith;
    a first pivot means movably disposed in said pivot opening through the open section of said housing unit for making pivotal connections therewith;

a second pivot means movably disposed in the bolt hole of said bolt stud through the open section of said housing unit for making pivotal connections therewith in conjunction with said first pivot means;

a linking member formed in conjunction with the open section of said housing unit, having an upper through hole, a lower through hole and a stud hole respectively provided therein being connected to said housing unit in the open section thereof through said stud hole and said blind hole with rear neck portions of said first and second pivot means separately located in said upper and lower through holes;

a first torsional means closely disposed around a middle portion of said first pivot means in a forward direction for providing a twisting force therewith in connection with a pivoting movement of said first pivot means; and a second torsional means closely disposed around said bolt stud of said housing unit in a reverse direction in connection with said second pivot means for providing another twisting force therewith; whereby, different turning movements of said first and second pivot means can be effected through said first and second torsional means.

2. A connecting device according to claim 1 wherein said first pivot means comprises a first pivot bolt having a front neck portion and a rear neck portion separately formed on an axis thereof with an outer diameter of said front and rear neck portions identical to an inner diameter of both the pivot opening in said housing unit and the upper through hole in said linking member, said first pivot bolt further including a stop pin fixed at a front portion thereof for keeping one end of said first torsional means in position thereat and a check pin provided at a rear portion thereof to govern the turning movement of said first pivot bolt.

3. A connecting device according to claim 1 wherein said second pivot means comprises a second pivot bolt having a front neck portion and a rear neck portion formed on an axis thereof, the front neck portion of said second pivot bolt being longer than said rear neck portion thereof with an outer diameter of said front neck portion being identical to an internal diameter of said bolt hole in said housing unit so that said front neck portion may be movably disposed therein and closely engaged with a portion of said second torsional means so as to govern the turning movement of said second pivot bolt.

4. A connecting device according to claim 1 wherein said linking member further comprises a vertical recess and a horizontal recess relatively formed around said upper through hole thereof so as to define an upper edge and a lower edge thereat which may be movably abutted by a check pin of said first pivot bolt during the turning movement thereof.

* * * * *